July 25, 1961     J. E. SCHAFER     2,993,292

FISH NET RETRIEVER RIG

Filed Aug. 12, 1960

INVENTOR.
Joseph E. Schafer
BY Stephen J. Rudy
atty.

2,993,292
FISH NET RETRIEVER RIG
Joseph E. Schafer, 1321 W. Melrose St., Chicago, Ill., assignor of twenty-one and two-thirds percent to Peter A. Dechant, twenty-one and two-thirds percent to Stephen Jacobs, and twenty-one and two-thirds percent to Ben Jacobs, all of Chicago, Ill.
Filed Aug. 12, 1960, Ser. No. 49,247
6 Claims. (Cl. 43—8)

This invention relates to the art of fishing and more particularly to a fish net retriever rig.

When using a so-called "gill-net" for catching fish such as smelt, it is important that the net be maintained in a vertical position in the desired depth of water if optimum results are to be achieved. In the usual type of fishing operations with a gill net, an anchor means is connected to one end of an anchor line, and a fishing line having a gill net attached thereto is supported for movement upon the anchor line by means of a trolley arrangement. In such manner, the gill net is placed at the desired water depth, and removed therefrom. Such an arrangement often produces less than satisfactory results because of the difficulty in moving the trolley on the anchor line without fouling, and in getting the net properly positioned.

The net retriever rig of the present invention eliminates such difficulties associated with the usual type of gill net fishing rigs, and provides very efficient and effective gill net fishing procedures.

The main object of this invention is to provide an improved fish net retriever rig.

A further object of this invention is to provide an improved fish net retriever rig which results in more effective and efficient handling of a gill net in fishing operations.

Still another object of this invention is to provide a fish net retriever rig for gill net fishing procedures, which allows easy and secure anchoring of a net supporting line, and avoids fouling of the gill net during placing, or removing the net from the water.

These and further objects and features of the invention will become more apparent from the following description and accompanying drawing wherein.

Figure 2:
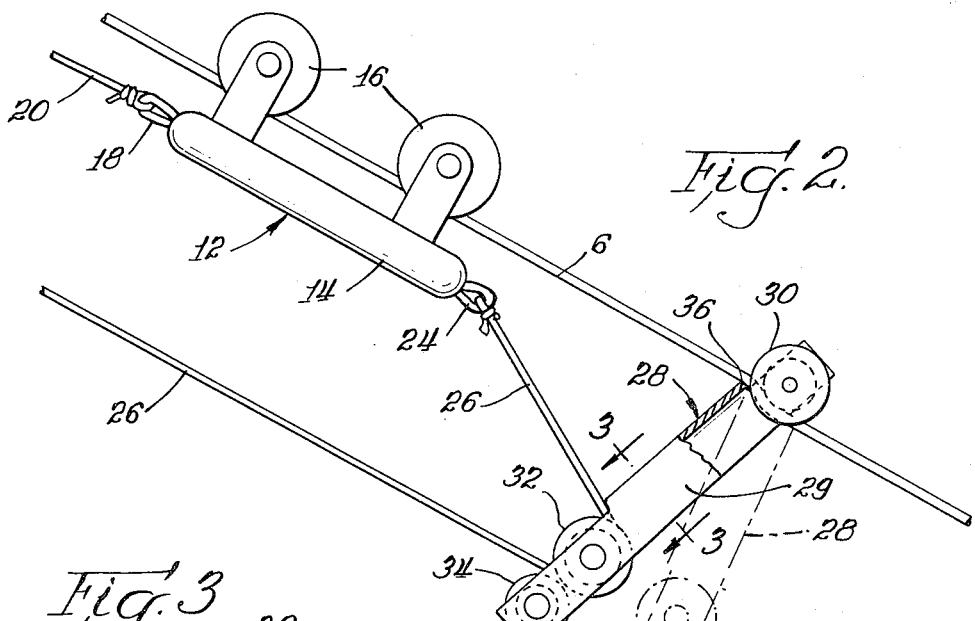
FIG. 2 is an enlarged detail of the gill net fishing rig of FIG. 1.
Figure 3:
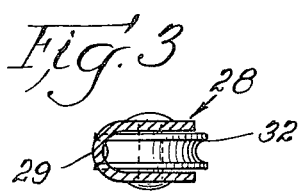
FIG. 3 is a section view generally as seen along line 3—3 in FIG. 2.

Referring now to the drawing, the numeral 6 identifies an anchor line which is affixed to an anchor 8 at one end and to a post means 10 at the other end, so that the line 6 may be maintained in taut condition. A trolley assemblage 12 is supported upon the anchor line 6, which assemblage includes an elongated weighted body member 14 and a pair of tandem pulley wheels 16, as best seen in FIG. 2. Affixed to one end of the body member 14 is an eyelet 18 to which is attached a net line 20, the other end of the line 20 being secured to the post 10. A weighted gill net 22 is attached to the line 20. A second eyelet 24 is secured to the trolley body member 14, the latter eyelet having a retriever line 26 connected thereto.

A net retriever assemblage 28 is supported by means of a supporting pulley wheel 30 upon the anchor line 6, which net retriever has a retriever line pulley wheel 32 around which the line 26 is threaded, the free end of the retriever line 26 being secured to the post 10. A guide pulley wheel 34 is positioned adjacent the pulley wheel 32 so as to maintain the line 26 in threaded engagement with the pulley wheel 32.

The net retriever assemblage 28 is preferably formed from a U-shaped channel section having a center end portion cut out at the upper end to provide clearance for the pulley wheel 30, and a similar center portion cut out at the other end to provide clearance for the pulley wheels 32 and 34. It will be seen that the cutout portion of the channel member 29 adjacent the supporting pulley wheel 30 is such so that an edge 36 will engage the anchor line 6 when the retriever assemblage 28 is rotated toward the trolley assemblage 12, and will be disengaged from the anchor line 6 when the retriever assemblage is rotated toward the dotted line position as illustrated in FIG. 2. Rotation of the retriever assemblage 28 toward the trolley assemblage 12 may be accomplished by pulling on the lines 20 and 26; when pulling effort is released on the lines 20 and 26, the weight of the retriever assemblage 28 will cause it to rotate into the opposite position as illustrated in dotted lines. In such manner the net retriever assemblage 28 may be selectively locked to the anchor line 6 as will be required during the fishing operations.

Figure 1:
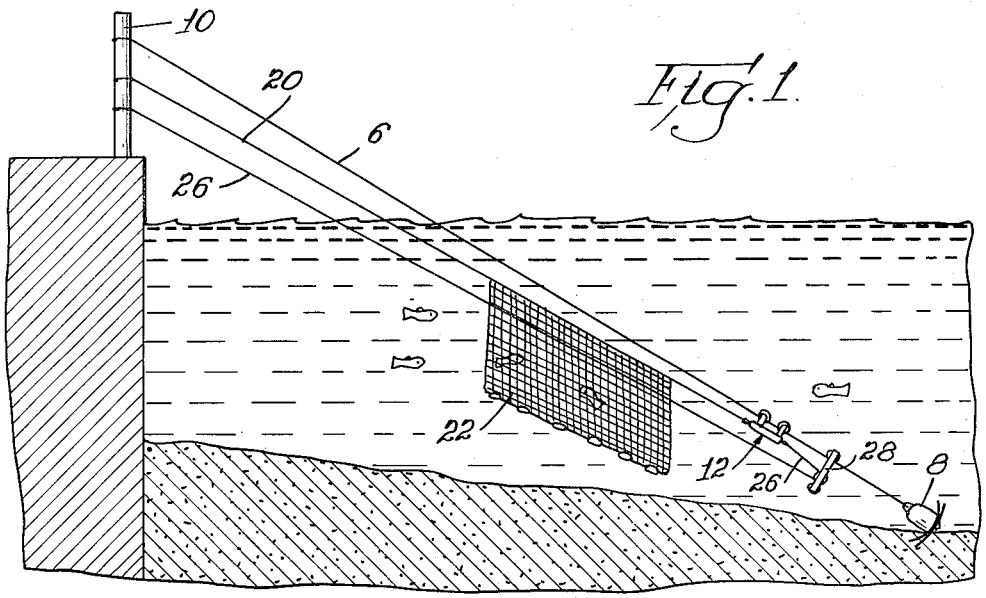
FIG. 1 is a sketch showing a gill net fishing rig embodying the principles of the invention.

To utilize the gill net fish rig of the invention, the anchor 8 is thrown in the water and set by pulling upon the anchor line 6. Next, the net retriever assemblage 28 and the trolley assemblage 12, with associated lines 20 and 26 connected as above described, are threaded on the anchor line 6 and the end of the anchor line is secured to the post 10. The net retriever assemblage 28, which is preferably made of a relatively heavy material such as brass, is allowed to run down the anchor line 6 until it is somewhat near the anchor 8 as shown in FIG. 1. The trolley assemblage 12 is then moved down the anchor line by pulling upon the retriever line 26, care being taken to see that sufficient pull is exerted upon the net retriever assemblage 28 to lock it upon the anchor line 6, as hereinbefore described. As the trolley assemblage 12 is pulled down into the water, the gill net 22 will, of course, be lowered into the water by virtue of attachment to the net line 20. When the gill net 22 has been positioned in the desired locale within the water, the ends of the lines 20 and 26 are attached to the post 10.

When it is desired to remove the gill net from the water for inspection, or removal of caught fish, all that is necessary is to loosen both lines 20 and 26 from the post 10, following which the line 20 may be pulled upwardly with the net thereon. To lower the gill net into the water, the above described procedure is again followed.

From the foregoing it will be seen that the fish net retriever rig of the invention will satisfy the objectives as set forth in the early part of the disclosure.

The foregoing description has been given in detail without thought of limitation since the inventive principles involved are capable of assuming other forms without departing from the spirit of the invention or the scope of the following claims.

What is claimed is:

1. A fish net retriever rig for use upon a line which is anchored in the water comprising, a trolley assemblage supported for movement upon the anchored line, a net line affixed at one end to the trolley assemblage, a retriever line affixed to the opposite end of the trolley assemblage, and a retriever assemblage supported for movement upon the anchored line, said retriever assemblage being adapted for locking engagement upon the anchored line when a pulling action is made thereupon by said retriever line.

2. A fish net retriever rig for use upon a line which is anchored in water comprising, a trolley assemblage supported for movement upon the anchored line, said trolley assemblage including an elongated weighted body member and a pair of tandem pulley wheels, a net line affixed at one end of the body member and a retriever line affixed to the other end of the body member, and a retriever assemblage supported for movement upon the anchored line, said retriever assemblage being adapted for locking engagement upon the anchored line when a pulling action is made thereupon by said retriever line.

3. A fish net retriever rig for use upon a line which is anchored in water comprising, a trolley assemblage supported for movement upon the anchored line, said trolley assemblage including an elongated weighted body member and a pair of tandem pulley wheels, a net line affixed at one end of the body member and a retriever line affixed to the other end of the body member, a net attached to the net line, and a retriever assemblage supported for movement upon the anchored line, said retriever assembly including a supporting pulley wheel and a retriever line pulley wheel, said retriever assemblage being adapted for locking engagement upon the anchored line when the retriever line is pulled against the retriever line pulley wheel a given amount.

4. A fish net retriever rig according to claim 3, wherein said retriever assemblage is formed from a U-shaped channel member having a first center end portion cut-out to provide clearance for the supporting pulley wheel and to form an edge which is adapted to engage the retriever line for locking the retriever assemblage thereupon.

5. A fish net retriever rig according to claim 4, wherein said U-shaped channel member has a second center end cut-out portion to provide clearance for the retriever line pulley wheel.

6. A fish net retriever rig according to claim 5, wherein a guide pulley wheel is arranged within the second cut-out portion to maintain the retriever line in threaded engagement with the retriever line pulley wheel.

References Cited in the file of this patent

UNITED STATES PATENTS

| | | |
|---|---|---|
| 1,163,193 | Althoff | Dec. 7, 1915 |
| 1,992,619 | Johnson | Feb. 25, 1935 |
| 2,550,282 | McAvoy | Apr. 24, 1951 |